US010525963B2

United States Patent
Iwashita et al.

(10) Patent No.: US 10,525,963 B2
(45) Date of Patent: Jan. 7, 2020

(54) CONTROL DEVICE IN HYBRID VEHICLE

(71) Applicant: Honda Motor Co., Ltd., Tokyo (JP)

(72) Inventors: Hideaki Iwashita, Saitama (JP); Kazuhiko Kitano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 177 days.

(21) Appl. No.: 15/702,729

(22) Filed: Sep. 12, 2017

(65) Prior Publication Data
US 2018/0072302 A1    Mar. 15, 2018

(30) Foreign Application Priority Data

Sep. 13, 2016 (JP) .................. 2016-178892

(51) Int. Cl.
*B60W 20/10* (2016.01)
*B60W 10/06* (2006.01)
(Continued)

(52) U.S. Cl.
CPC ............... *B60W 20/10* (2013.01); *B60K 6/48* (2013.01); *B60K 6/547* (2013.01); *B60W 10/06* (2013.01); *B60W 10/08* (2013.01); *B60W 10/11* (2013.01); *B60W 10/113* (2013.01); *B60W 20/30* (2013.01); *B60W 20/50* (2013.01); *B60W 30/18036* (2013.01); *B60W 50/04* (2013.01); *B60W 50/14* (2013.01); *B60K 2006/4825* (2013.01); *B60W 2050/0215* (2013.01); *B60W 2050/146* (2013.01); *B60W 2510/0208* (2013.01); *B60W 2510/0638* (2013.01); *B60W 2510/104* (2013.01); *B60W 2510/1005* (2013.01); *B60W 2510/107* (2013.01); *B60W 2510/1015* (2013.01); *B60W 2520/04* (2013.01); *B60W 2520/10* (2013.01); *B60W 2540/10* (2013.01); *B60W 2710/0605* (2013.01); *B60W 2710/1005* (2013.01); *Y02T 10/6221* (2013.01)

(58) Field of Classification Search
CPC ...... B60W 20/10; B60W 10/06; B60W 10/08; B60W 10/11; B60W 10/113; B60W 20/30; B60W 20/50; B60W 30/18036; B60W 50/14; B60W 50/04; B60K 6/48; B60K 6/547

See application file for complete search history.

(56) References Cited

FOREIGN PATENT DOCUMENTS

| CN | 103747994 | 4/2014 |
|---|---|---|
| CN | 104149784 | 11/2014 |

(Continued)

OTHER PUBLICATIONS

"Office Action of China Counterpart Application", dated May 13, 2019, with English translation thereof, p. 1-p. 10.

*Primary Examiner* — Abby Y Lin
*Assistant Examiner* — Renee LaRose
(74) *Attorney, Agent, or Firm* — JCIPRNET

(57) ABSTRACT

A revolution rate sensor configured to detect a revolution rate of a first input shaft and an ECU configured to estimate the revolution rate of the first input shaft using another method which is not based on detection of the revolution rate sensor are provided, and the ECU performs engagement permission determination of a switching mechanism associated with the lowest shift stage in first engagement switching mechanisms using an estimated value of the revolution rate of the first input shaft estimated by the ECU when it is determined that a revolution rate of the first input shaft cannot be detected normally by the revolution rate sensor.

18 Claims, 5 Drawing Sheets

(51) Int. Cl.
*B60W 10/11* (2012.01)
*B60K 6/48* (2007.10)
*B60W 20/50* (2016.01)
*B60W 10/08* (2006.01)
*B60W 20/30* (2016.01)
*B60W 50/04* (2006.01)
*B60K 6/547* (2007.10)
*B60W 10/113* (2012.01)
*B60W 30/18* (2012.01)
*B60W 50/14* (2012.01)
*B60W 50/02* (2012.01)

(56) References Cited

FOREIGN PATENT DOCUMENTS

| | | |
|---|---|---|
| CN | 105189173 | 12/2015 |
| CN | 105818669 | 8/2016 |
| JP | 2009173196 | 8/2009 |
| JP | 2015-175463 | 10/2015 |

CONTROL DEVICE IN HYBRID VEHICLE

CROSS-REFERENCE TO RELATED APPLICATION

This application claims the priority benefit of Japan Application no. 2016-178892, filed on Sep. 13, 2016. The entirety of the above-mentioned patent application is hereby incorporated by reference herein and made a part of this specification.

BACKGROUND OF THE INVENTION

Field of the Invention

The present invention relates to a control device in a hybrid vehicle which controls operations of driving sources and a transmission in the hybrid vehicle which includes an internal combustion engine and an electric motor serving as the driving sources and a stepped type transmission divided into two systems of a shift shaft at an odd shift stage side and a shift shaft at an even shift stage side.

Description of Related Art

In the related art, there are hybrid vehicles including engines (internal combustion engines) and motors (electric motors) serving as driving sources. In such hybrid vehicles, there are hybrid vehicles including a stepped type transmission in which a plurality of shift stages are switched and set so that a driving force of at least any of internal combustion engines and electric motors can be transferred to drive wheels.

As a transmission used for a hybrid type vehicle as described above, for example, as illustrated in Patent Document 1, there is a twin clutch type transmission which includes a first clutch (an odd stage clutch) in which an input shaft in a first shift mechanism constituted of shift stages of odd stages (1-, 3-, and 5-speed stages and the like) and an engine output shaft in an internal combustion engine can be connected and disconnected and a second clutch (an even stage clutch) in which an input shaft in a second shift mechanism constituted of shift stages of even stages (2-, 4-, and 6-speed stages and the like) and the engine output shaft therein can be connected and disconnected and in which the two clutches are alternately switched so that shifting between the stages is performed. Furthermore, as such a twin clutch type transmission, there is a transmission constituted to join a rotating shaft in an electric motor to an input shaft in a first shift mechanism.

The transmission disclosed in Patent Document 1 needs to engage (synchronously engage) a synchromesh mechanism (a synchronous engagement mechanism) for setting a 1-speed stage provided at a first input shaft to set a reverse stage and to further engage a synchromesh mechanism for setting a reverse stage provided at a reverse shaft.

Here, in the configuration of the transmission disclosed in Patent Document 1, there is a problem about permission determination which cannot be performed for synchronous engagement (a 1-speed in-gear) in a 1-speed synchromesh mechanism because a revolution rate difference (a revolution difference) of a member engaged by the 1-speed synchromesh mechanism provided at a first rotating shaft cannot be ascertained if a revolution rate sensor (a resolver) configured to detect a revolution rate of the first input shaft fails. For this reason, there is a problem about setting which cannot be performed for the reverse stage due to engagement in the 1-speed synchromesh mechanism which cannot be performed.

Note that, when the revolution rate sensor configured to detect rotation of the first input shaft fails, basically, since so-called one shaft travel using only even shift stages which can be set by a gear in a second input shaft (an even stage shaft) is performed as a fail-safe operation, odd shift stages which can be set by a gear in a first input shaft are not used. For this reason, forward travel using a lowest even shift stage (a 2-speed stage) and travel of the hybrid type vehicle using so-called jumping transmission are possible using only the even shift stages.

PRIOR ART DOCUMENT

Patent Documents

[Patent Document 1] Japanese Unexamined Patent Application Publication No. 2015-175463

SUMMARY OF THE INVENTION

The present invention was made in view of the above-described circumstances, and an objective thereof is to provide a control device in a hybrid vehicle in which in-gear permission determination and an in-gear operation in an odd shift stage are possible and rearward travel of the hybrid vehicle using setting of a reverse stage can be secured even when a revolution rate sensor configured to detect a revolution rate of the shift shaft at the odd shift stage side fails in a hybrid vehicle which includes a stepped type transmission divided into two systems of a shift shaft at an odd shift stage side and a shift shaft at an even shift stage side.

In order to solve the above-described problems, the present invention includes a control device in a hybrid vehicle which includes: an internal combustion engine (2) and an electric motor (3) serving as driving sources in the hybrid vehicle; a transmission (4) including: a first input shaft (IMS) which is connected to the electric motor (3) and is optionally connected to the engine output shaft (2a) in the internal combustion engine (2) with a first clutch (C1); a second input shaft (SS) which is optionally connected to the engine output shaft (2a) in the internal combustion engine (2) with a second clutch (C2); an output shaft (CS) configured to output power toward drive wheels (WR and WL); a first shift mechanism (G1) including a plurality of shift gears (43, 45, and 47) provided between the first input shaft (IMS) and the output shaft (CS) and one or more engagement switching mechanisms (41, 81, and 82) which optionally engage any of the plurality of shift gears with the first input shaft (IMS) or the output shaft (CS) and by which any one of odd shift stages and even shift stages are able to be set; a second shift mechanism (G2) including a plurality of other shift gears (42, 44, and 46) provided between the second input shaft (SS) and the output shaft (CS) and one or more engagement switching mechanisms (83 and 84) which optionally engage any of the plurality of other shift gears with the second input shaft (SS) or the output shaft (CS) and by which the other of the odd shift stages and the even shift stages are able to be set; and a reverse shift mechanism (GR) in which a reverse shift stage disposed between the first input shaft (IMS) and the output shaft (CS) is able to be set, and an ECU (10) configured to control driving of the hybrid vehicle using the internal combustion engine (2) and the electric motor (3), the control device in the hybrid vehicle including: a first input shaft revolution rate detection unit (101) configured to detect a revolution rate of the first input shaft (IMS); and the ECU (10) configured to estimate the revolution rate of the first input shaft (IMS) using another method which is not based on the detection of the first input shaft revolution rate detection unit (101), wherein, when revolution rate detection-disable determination serving as determination, that is, when the revolution rate of the first input shaft (IMS) is unable to be detected normally by the first input shaft revolution rate detection unit (101) is performed, the ECU (10) performs engagement permission determination in a switching mechanism (41) associated with the lowest shift stage in the first shift mechanism (G1) using an estimated value of the revolution rate of the first input shaft (IMS) estimated by the ECU (10).

In the transmission with the above-described configuration, since a revolution rate difference (a revolution difference) generated in the switching mechanism associated with the lowest shift stage in the first shift mechanism cannot be ascertained when the revolution rate of the first input shaft cannot be detected normally by the first input shaft revolution rate detection unit, engagement permission determination in the switching mechanism cannot be performed, and an engagement operation in the switching mechanism cannot be performed. Thus, according to the control device in the hybrid vehicle according to the present invention, engagement permission determination in the switching mechanism associated with the lowest shift stage in the first shift mechanism can be performed using the estimated value of the revolution rate of the first input shaft estimated by the ECU when the revolution rate of the first input shaft cannot be detected normally by the first input shaft revolution rate detection unit. Therefore, an engagement operation in the switching mechanism can be secured even when a malfunction such as failure in the first input shaft revolution rate detection unit or a peripheral device thereof occurs. Note that a "state in which the revolution rate of the first input shaft cannot be detected normally by the first input shaft revolution rate detection unit" mentioned herein may include not only a case in which the revolution rate of the first input shaft cannot be detected due to failure of the first input shaft revolution rate detection unit itself but also a case, for example, in which the revolution rate of the first input shaft cannot be determined using a detected value of the first input shaft revolution rate detection unit due to any abnormality which has occurred such as abnormality of a communication function between the first input shaft revolution rate detection unit and the ECU, abnormality of other units, and the like.

Also, the control device in the hybrid vehicle may include: an output shaft revolution rate detection unit (102) configured to detect a revolution rate of the output shaft (CS), wherein the ECU (10) estimates the revolution rate of the first input shaft (IMS) using the revolution rate of the output shaft (CS) detected by the output shaft revolution rate detection unit (102) when any of switching mechanisms (81 or 82) other than the switching mechanism (41) associated with the lowest shift stage in the first shift mechanism (G1) is engaged.

As described above, when any of the switching mechanisms other than the switching mechanism associated with the lowest shift stage in the first shift mechanism is engaged, since the first input shaft and the output shaft integrally rotate due to the engagement in the switching mechanism, a revolution rate of the first input shaft can be estimated using the revolution rate of the output shaft detected by the output shaft revolution rate detection unit.

The control device in the hybrid vehicle may include: a second input shaft revolution rate detection unit (103) configured to detect a revolution rate of the second input shaft (SS), wherein the ECU (10) estimates the revolution rate of the first input shaft (IMS) using the revolution rate of the second input shaft (SS) detected by the second input shaft revolution rate detection unit (103) when none of the switching mechanisms other than the switching mechanism (41) associated with the lowest shift stage in the first shift mechanism (G1) is engaged and a switching mechanism (85) in the reverse shift mechanism (GR) is engaged.

As described above, when the switching mechanism in the reverse shift mechanism is engaged even when none of the switching mechanisms other than the switching mechanism associated with the lowest shift stage in the first shift mechanism is engaged, since the first rotating shaft and the second rotating shaft integrally rotate with the switching mechanism in the reverse shift mechanism, a revolution rate of the first input shaft can be estimated using the revolution rate of the second input shaft detected by the second input shaft revolution rate detection unit.

The control device in the hybrid vehicle may include: an internal combustion engine revolution rate detection unit (104) configured to detect an engine revolution rate of the internal combustion engine (2), wherein the ECU (10) estimates the revolution rate of the first input shaft (IMS) using the engine revolution rate of the internal combustion engine (2) detected by the internal combustion engine revolution rate detection unit (104) when none of the switching mechanisms other than the switching mechanism (41) associated with the lowest shift stage in the first shift mechanism (G1) is engaged, a switching mechanism (85) in the reverse shift mechanism (GR) is not engaged, and the first clutch (C1) is fastened.

As described above, when the first clutch is fastened even when none of the switching mechanisms other than the switching mechanism associated with the lowest shift stage in the first shift mechanism is engaged and the switching mechanism in the reverse shift mechanism is not engaged, since the rotation of the engine output shaft in the internal combustion engine is transferred to the first input shaft with the first clutch, a revolution rate of the first input shaft can be estimated using the engine revolution rate of the internal combustion engine detected by the internal combustion engine revolution rate detection unit.

The control device in the hybrid vehicle may include: a lubricating oil temperature detection unit (105) configured to detect a temperature of a lubricating oil used to lubricate at least a constituent part of the first shift mechanism (G1), wherein the ECU (10) estimates the revolution rate of the first input shaft (IMS) using the temperature of the lubricating oil detected by the lubricating oil temperature detection unit (105) when none of the switching mechanisms other than the switching mechanism (41) associated with the lowest shift stage in the first shift mechanism (C1) is engaged, a switching mechanism (85) in the reverse shift mechanism (GR) is not engaged, and the first clutch (C1) is not fastened.

As described above, when none of the switching mechanisms other than the switching mechanism associated with the lowest shift stage in the first shift mechanism is engaged, the switching mechanism in the reverse shift mechanism is not engaged, and the first clutch is not fastened, a spontaneous decrease of a revolution rate obtained by considering friction along with the rotation of the first rotating shaft is predicted using the temperature of the lubricating oil detected by the lubricating oil temperature detection unit so that a revolution rate of the first input shaft can be estimated.

In the control device in the hybrid vehicle, the transmission (4) may be constituted such that the switching mechanism (85) in the reverse shift mechanism (GR) is engaged with the switching mechanism (41) associated with the lowest shift stage in the first shift mechanism (G1) is engaged so that a reverse driving force is transferred to the drive wheels (WR and WL).

According to the control device in the hybrid vehicle according to the present invention, since the engagement permission determination in the switching mechanism associated with the lowest shift stage in the first shift mechanism can be performed using the estimated value of the revolution rate of the first input shaft estimated by the ECU, the reverse driving force can be transferred to the drive wheels even when the revolution rate of the first input shaft cannot be detected normally by the first input shaft revolution rate detection unit in the transmission constituted such that the switching mechanism in the reverse shift mechanism is engaged and the switching mechanism associated with the lowest transmission in the first shift mechanism is engaged as described above so that the reverse driving force is transferred to the drive wheels. In other words, the reverse stage can be set in the transmission.

The control device in the hybrid vehicle may include: a shift operating unit (110) by which a driver performs a selection operation of a shift position in the hybrid vehicle; a shift position detection unit (106) configured to detect the shift position selected through the selection operation of the shifting operating unit (110); and a display unit (107) configured to display indication concerning preparation of setting of a reverse stage in the transmission (4), wherein the ECU (10) performs control so that the indication concerning the preparation of the reverse stage is displayed on the display unit (107) if the revolution rate difference between switching mechanisms (41) associated with the lowest shift stage in the first shift mechanism (G1) based on the revolution rate of the first input shaft (IMS) estimated by the ECU (10) is the predetermined value or more when the shift position of the reverse stage is detected by the shift position detection unit (106).

In the control device in the hybrid vehicle, the ECU (10) may end the display of the indication concerning the preparation of the reverse stage on the display unit (107) if the setting of the reverse stage has been completed through the engagement of the switching mechanism (41) associated with the lowest shift stage in the first shift mechanism (G1).

With such a configuration, when the revolution rate difference in the switching mechanism associated with the lowest shift stage in the first switching mechanism based on the revolution rate of the first input shaft estimated by the estimation unit is the predetermined value or more, since it takes time to engage the switching mechanism and accordingly to complete setting of the reverse stage, indication concerning preparation of the setting of the reverse stage is displayed so that the driver of the vehicle can be notified of the indication.

The control device in the hybrid vehicle may include: a vehicle speed detection unit (35) configured to detect a vehicle speed, wherein the ECU (10) permits the setting operation of the reverse stage by the shift operating unit (110) only if the vehicle speed detected by the vehicle speed detection unit (35) is a first threshold value or less when the revolution rate detection-disable determination is not performed, and permits the setting operation of the reverse stage by the shift operating unit (110) only if a vehicle speed detected by the vehicle speed detection unit (35) is a second threshold value or less which is smaller than the first threshold value when the revolution rate detection-disable determination is performed.

Since the revolution rate of the first input shaft cannot be accurately ascertained when the revolution rate detection-disable determination is performed, that is, when it is determined that the revolution rate of the first input shaft cannot be detected normally by the first input shaft revolution rate detection unit, it takes longer to actually set the reverse stage due to time spent waiting for a decrease in the revolution rate of the first input shaft after the setting operation of the reverse stage is performed by the shift operating unit. For this reason, here, when the revolution rate detection-disable determination is performed, the threshold value (the second threshold value) of the vehicle speed used to permit the setting operation of the reverse stage using the shift operating unit is set to a vehicle speed which is lower than the threshold value (the first threshold value) when the revolution rate detection-disable determination is not performed. Thus, time taken to actually set the reverse stage after the setting operation in the reverse stage by the shift operating unit when the revolution rate of the first input shaft cannot be detected normally due to failure or the like of the first input shaft revolution rate detection unit can be prevented from becoming long.

The control device in the hybrid vehicle may include: an accelerator operator (120) operated by the driver in the vehicle; and a ECU (10) configured to control a degree of throttle opening in the internal combustion engine (3) in accordance with an operation quantity by the accelerator operator (120), wherein, when a shift position (P/N) at which the vehicle is stopped is detected by the shift position detection unit (106), the ECU controls the degree of throttle opening in the internal combustion engine to be limited to a predetermined value or less regardless of the operation quantity by the accelerator operator.

Since there is a concern about the revolution rate of the first input shaft not being able to be accurately ascertained when the revolution rate detection-disable determination is performed, when the revolution rate of the first rotating shaft is rapidly increased by rapidly increasing the degree of throttle opening in the internal combustion engine in this case, it takes long time to determine a decrease in the revolution rate. Thus, in the present invention, when the shift position at which the hybrid vehicle is stopped is detected by the shift position detection unit, control is performed to limit the degree of throttle opening in the internal combustion engine to the predetermined value or less regardless of the operation quantity of the accelerator operator so that an excess increase in the revolution rate of the internal combustion engine is prevented and thus determination of a decrease in the revolution rate of the first input shaft can be prevented from taking up time. Therefore, engagement permission determination in the switching mechanism can be performed earlier than usual even when the revolution rate detection-disable determination is performed.

Moreover, the reference numerals in the parenthesis described above show the reference numerals of configuration components in the embodiments described below as an example of the present invention.

DESCRIPTION OF THE EMBODIMENTS

Figure 1:
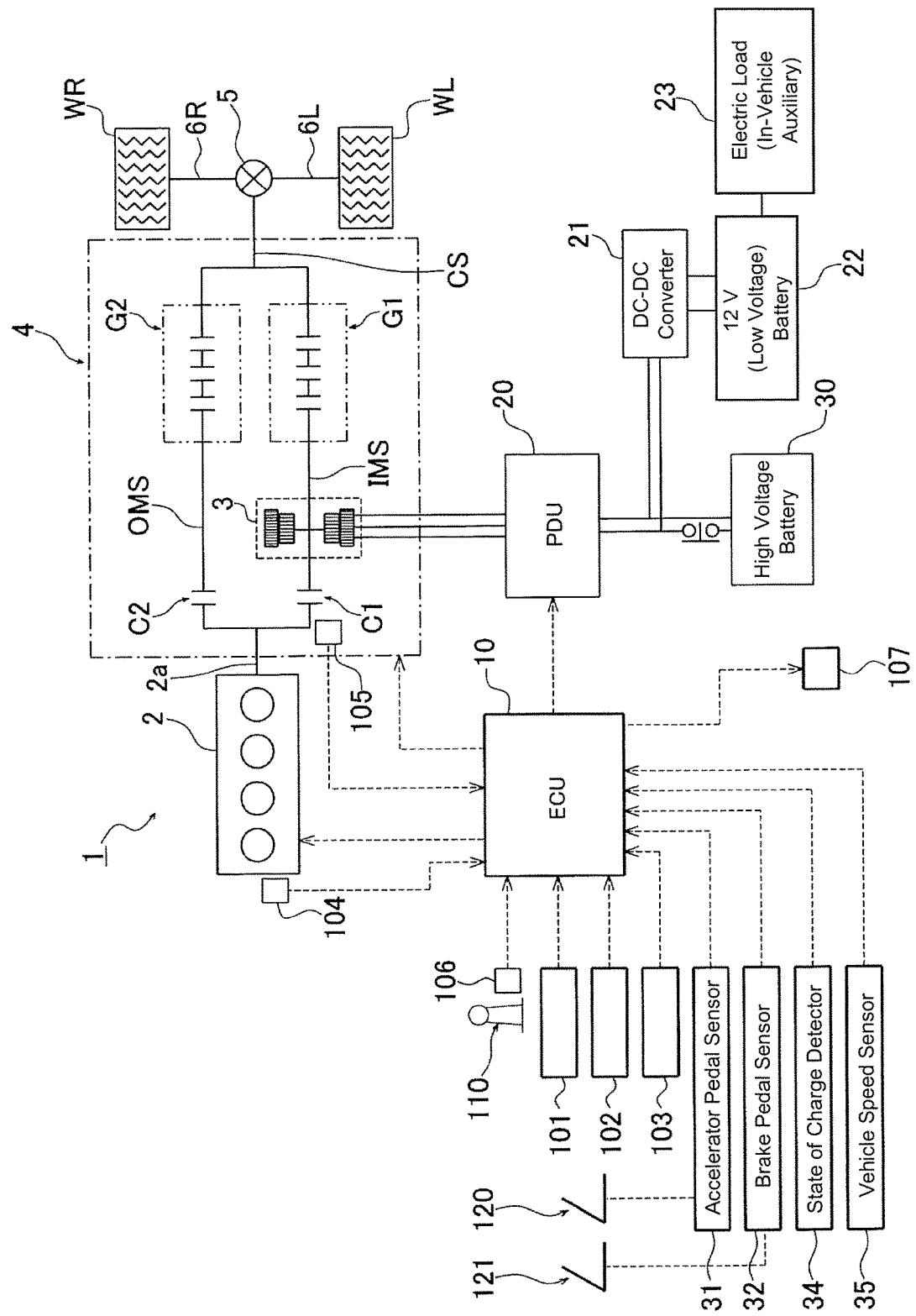
FIG. 1 is a schematic diagram illustrating a configuration example of a hybrid vehicle including a control device according to an embodiment of the present invention.

Hereinafter, an embodiment of the present invention will be described in detail with reference to the accompanying drawings. FIG. 1 is a schematic diagram illustrating a configuration example of a vehicle including a control device of a hybrid vehicle according to an embodiment of the present invention. As shown in FIG. 1, a vehicle 1 in this embodiment is a vehicle of a hybrid car including an internal combustion engine 2 and an electric motor 3 serving as driving sources and further includes a transmission 4, a differential mechanism 5, right and left drive shafts 6R and 6L, and right and left drive wheels WR and WL in addition to a power drive unit (PDU) 20 configured to control the electric motor 3, a high voltage battery (a high voltage condenser) 30, a direct current (DC)-DC converter (a transformer) 21, a 12 V battery (a low voltage condenser) 22, and an electric load (a low voltage electric load) 23 constituted of an in-vehicle auxiliary or the like.

Here, the electric motor 3 is a motor and includes a motor generator, and the high voltage battery 30 is a condenser and includes a capacitor. Furthermore, the internal combustion engine 2 is an engine and includes a diesel engine, a turbo engine, or the like. Revolution drive forces in the internal combustion engine (hereinafter referred to as an "engine") 2 and the electric motor (hereinafter referred to as a "motor") 3 are transferred to the right and left drive wheels WR and WL via the transmission 4, the differential mechanism 5, and the drive shafts 6R and 6L.

As shown in FIG. 1, the transmission 4 is constituted to include a first input shaft (an inner main shaft which will be described below) IMS connected to the motor 3 and optionally connected to the crankshaft 2a of the engine 2 via a first clutch (an odd stage clutch which will be described below) C1, a second input shaft (an outer main shaft or a secondary shaft which will be described below) OMS (SS) optically connected to the crankshaft 2a of the engine 2 via a second clutch (an even stage clutch which will be described below) C2, an output shaft CS configured to output power toward the drive wheels WR and WL, a first shift mechanism G1 which is disposed between the first input shaft IMS and the output shaft CS and in which a plurality of shift stages (1-, 3-, and 5-speed stages, and the like) belonging to odd stages from the lowest shift stage can be set, and a second shift mechanism G2 which is disposed between the second input shaft OMS (SS) and the output shaft CS and in which a plurality of shift stages (2-, 4-, and 6-speed stages, and the like) belonging to even stages from the lowest shift stage can be set. Note that, although FIG. 1 illustrates a simplified configuration of the transmission 4, a more detailed configuration included in the transmission 4 is illustrated in a skeleton diagram shown in FIG. 2.

Also, the vehicle 1 includes an electronic control unit (ECU) 10 configured to control the engine 2, the motor 3, the transmission 4, the differential mechanism 5, the DC-DC converter 21, the high voltage battery 30, the 12 V battery 22, and the like. The ECU 10 may be constituted as a single unit or may be constituted of, for example, a plurality of ECUs such as an engine ECU configured to control the engine 2, a motor generator ECU configured to control the motor 3 and the DC-DC converter 21, a battery ECU configured to control the high voltage battery 30, and an automatic transmission (AT)-ECU configured to control the transmission 4. The ECU 10 in this embodiment controls the engine 2 and the motor 3 and performs control of electric power exchange in the high voltage battery 30, the PDU 20, and the 12 V battery 22, control of transmission operation using the transmission 4, and the like. Therefore, the ECU 10 also controls a degree of throttle opening (a degree of throttle valve opening) of the engine 2.

The ECU 10 performs control so that independent motor travel (EV travel) in which only the motor 3 is used as a power source is performed, independent engine travel in which only the engine 2 is used as a power source is performed, or cooperative driving (HEV travel) in which both of the engine 2 and the motor 3 are used as a power source in accordance with various operating conditions.

Also, the ECU 10 receives inputs of various signals such as a degree of accelerator pedal opening from an accelerator pedal sensor 31 configured to detect a stepping quantity on an accelerator pedal (an accelerator operator) 120, a degree of brake pedal opening from a brake pedal sensor 32 configured to detect a stepping quantity on a brake pedal 121, a shift position from a shift position sensor 106 configured to detect a shift position (a position such as P, N, D, 1, 2, and the like) based on an operation of a shift lever 110 by a driver, a state of charge from a state of charge detector 34 configured to measure the state of charge (SOC) of the high voltage battery 30, and a vehicle speed from a vehicle speed sensor (a vehicle speed detection unit) 35 configured to detect a vehicle speed as control parameters. Furthermore, although not illustrated, the ECU 10 may further receive an input of data associated with a road situation (for example, a flat road, uphill, downhill, and the like) under which the vehicle 1 is currently traveling from a car navigation system or the like mounted in the vehicle 1.

The engine 2 is an internal combustion engine configured to generate a driving force used to move the vehicle 1 by mixing a fuel and air and combusting the mixture. The motor 3 functions as a motor configured to generate a driving force used to move the vehicle 1 using electric energy of the high voltage battery 30 during cooperative driving of the engine 2 and the motor 3 and independent travel of only the motor 3 and functions as a generator configured to generate electricity using regeneration during deceleration of the vehicle 1. The high voltage battery 30 is charged with electric power (regeneration energy) generated by the motor 3 at the time of the regeneration of the motor 3.

The PDU 20 is connected to the high voltage battery 30 configured to exchange electric power with the motor 3. Here, electric power to be exchanged may include, for example, supply electric power supplied to the motor 3 during driving or an assist operation of the motor 3 and output electric power which is output from the motor 3 when the motor 3 generates electricity using a regeneration operation or boost driving. Moreover, the PDU 20 receives a control command from the ECU 10 and controls driving and electricity-generation of the motor 3. For example, when the motor 3 is driven, DC electric power which is output from the high voltage battery 30 is converted into three-phase alternating current (AC) electric power on the basis of a torque command which is output from the ECU 10 and is supplied to the motor 3. On the other hand, when the motor 3 generates electricity, the three-phase AC electric power which is output from the motor 3 is converted into DC electric power, and the high voltage battery 30 is charged with the DC electric power.

Also, the 12 V battery (a low voltage battery) 22 configured to drive an electric load 23 constituted of various auxiliaries is connected in parallel with the PDU 20 and the high voltage battery 30 with the DC-DC converter (the transformer) 21. The DC-DC converter 21 is, for example, a bidirectional DC-DC converter, and a voltage between terminals in the 12 V battery 22 is stepped up and thus the high voltage battery 30 can be charged with the voltage in a case in which a voltage between terminals in the PDU 20 when terminals in the high voltage battery 30 are connected or the motor 3 is subject to a regeneration operation or boost driving is stepped down to a predetermined voltage value and the 12 V battery 22 is charged with the voltage, and the state of charge (SOC) in the high voltage battery 30 is reduced. Furthermore, examples of the various auxiliaries constituting the electric load 23 include a defroster unit mounted in the vehicle 1, communication and power transmission devices for the ECU 10, a car audio and accessory devices thereof, a heater unit, lights (lightings), and the like.

A display unit 107 configured to display indication concerning preparation of setting of a reverse stage (R) by the transmission 4 which will be described below (display of indication concerning preparation of a reverse stage) is provided in the vehicle 1. The display unit 107 can function as, for example, a multi-information display (MID) provided in an instrument panel (not shown) inside a vehicle interior and configured to display a cruising distance, fuel efficiency, and the like.

Figure 2:
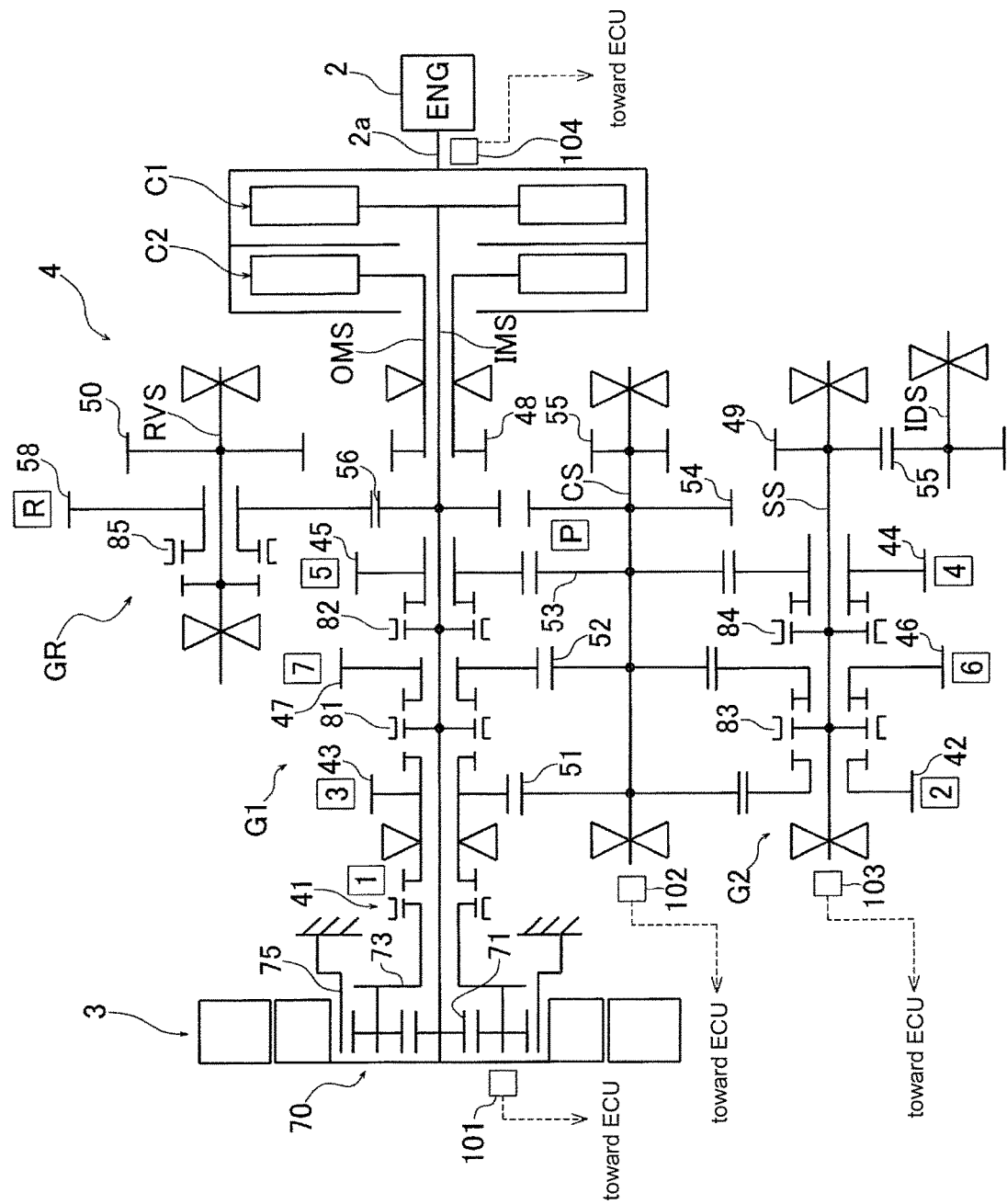
FIG. 2 is a skeleton diagram showing a detailed configuration of a transmission shown in FIG. 1.
Figure 3:
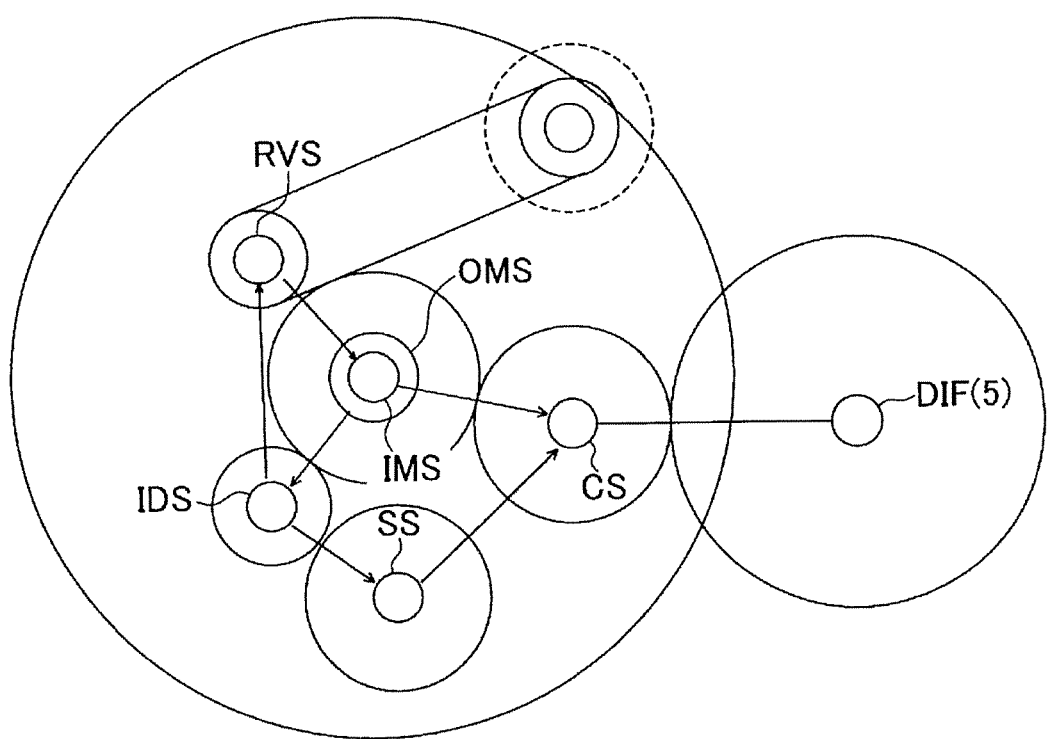
FIG. 3 is a conceptual diagram showing an engagement relationship between shafts of a transmission shown in FIG. 2.

Next, a detailed configuration example of the transmission 4 included in the vehicle 1 in this embodiment will be described. FIG. 2 is a skeleton diagram illustrating a detailed configuration example of the transmission 4 shown in FIG. 1. FIG. 3 is a conceptual diagram showing an engagement relationship between the shafts of the transmission 4 shown in FIG. 2. The transmission 4 is a parallel shaft type transmission of a forward 7-speed and rearward 1-speed and a dry twin clutch type transmission (a dual clutch transmission).

The crankshaft (an engine output shaft) 2a in the engine 2, the inner main shaft (the first input shaft) IMS connected to the motor 3, the outer main shaft (the second input shaft) OMS configured to form an outer cylinder of the inner main shaft IMS, the secondary shaft (the second input shaft) SS, the idle shaft IDS, and the reverse shaft RVS which are parallel to the inner main shaft IMS, and the counter shaft CS which is parallel to the shafts and configured to form an output shaft are provided in the transmission 4.

Among the shafts, the outer main shaft OMS is engaged with the reverse shaft RVS and the secondary shaft SS with the idle shaft IDS at all times, and the counter shaft CS is further engaged with the differential mechanism 5 (refer to FIG. 1) at all times.

The transmission 4 includes a motor (main shaft) revolution rate sensor 101 configured to detect a revolution rate of the motor 3 (the main shaft IMS), a counter shaft revolution rate sensor 102 configured to detect a revolution rate of the counter shaft CS, and a secondary shaft revolution rate sensor 103 configured to detect a revolution rate of a secondary shaft (the second input shaft) SS. Furthermore, the transmission 4 includes a crankshaft revolution rate sensor 104 configured to detect a revolution rate of the crankshaft 2a in the engine 2. Detected values of revolution rates detected by the motor revolution rate sensor 101, the counter shaft revolution rate sensor 102, the secondary shaft revolution rate sensor 103, and the crankshaft revolution rate sensor 104 are input to the ECU 10. Moreover, the motor revolution rate sensor 101 detects the revolution rate of the motor 3 and the revolution rate of the inner main shaft (the first input shaft) IMS connected to a rotating shaft in the motor 3 can thus be detected.

The transmission 4 includes the odd stage clutch (the first clutch) C1 and the even stage clutch (the second clutch) C2. The odd stage clutch C1 and the even stage clutch C2 are dry type clutches. The odd stage clutch C1 is coupled to the inner main shaft IMS. The even stage clutch C2 is coupled to the outer main shaft OMS (a part of the second input shaft) and is joined to the reverse shaft RVS and the secondary shaft SS (a part of the second input shaft) via the idle shaft IDS from a gear 48 fixed to the outer main shaft OMS.

A sun gear 71 in a planetary gear mechanism 70 is fixedly disposed at a predetermined place near the motor 3 in the inner main shaft IMS. Furthermore, a ring gear 75 and a carrier 73 in the planetary gear mechanism 70, a 3-speed driving gear 43, a 7-speed driving gear 47, and a 5-speed driving gear 45 are disposed on an outer circumference of the inner main shaft IMS in order from the left in FIG. 2. Note that the 3-speed driving gear 43 is also used as a 1-speed driving gear. A 1-speed synchromesh mechanism 41 is provided between the carrier 73 in the planetary gear mechanism 70 and the 3-speed driving gear 43 to be able to slide in an axial direction thereof.

The 3-speed driving gear 43, the 7-speed driving gear 47, and the 5-speed driving gear 45 can rotate relative to the inner main shaft IMS, and the 3-speed driving gear 43 can be joined to the carrier 73 in the planetary gear mechanism 70 with the 1-speed synchromesh mechanism 41. In addition, a 3-7-speed synchromesh mechanism 81 is provided in the inner main shaft IMS between the 3-speed driving gear 43 and the 7-speed driving gear 47 to be able to slide in the axial direction thereof, and a 5-speed synchromesh mechanism 82 is provided therein to correspond to the 5-speed driving gear 45 and to be able to slide in the axial direction thereof. A synchromesh mechanism corresponding to a desired gear stage is caused to slide and synchronizes with the gear stage so that the gear stage is joined to the inner main shaft IMS. The first shift mechanism G1 used to realize shift stages of odd stages is constituted of the gear and the synchromesh mechanism provided in association with the inner main shaft IMS. Note that the above-described driving gears 43, 45, and 47 are odd stage gears according to the present invention, and the above-described synchromesh mechanisms 41, 81, and 82 are first synchronous coupling devices (meshing devices). The driving gears 43, 45, and 47 in the first shift mechanism G1 are meshed with corresponding driven gears (output gears) 51, 52, and 53 provided in the counter shaft CS and rotatably drive the counter shaft CS.

A 2-speed driving gear 42, a 6-speed driving gear 46, and a 4-speed driving gear 44 are relatively rotatably disposed on an outer circumference of the secondary shaft SS (the second input shaft) in order from the left in FIG. 2. In addition, a 2-6-speed synchromesh mechanism 83 is provided in the secondary shaft SS between the 2-speed driving gear 42 and the 6-speed driving gear 46 to be able to slide in the axial direction thereof, and a 4-speed synchromesh mechanism 84 is provided therein to correspond to the 4-speed driving gear 44 and to be able to slide in the axial direction thereof. Also in this case, a synchromesh mechanism corresponding to a desired gear stage is caused to slide and synchronizes with the gear stage so that the gear stage is joined to the secondary shaft SS (the second input shaft). The second shift mechanism G2 used to realize shift stages of even stages is constituted of the gear and the synchromesh mechanism provided in association with the secondary shaft SS (the second input shaft). Note that the above-described driving gears 42, 44, and 46 are even stage gears according to the present invention, and the above-described synchromesh mechanisms 83 and 84 are second synchronous coupling devices (meshing devices). The driving gears in the second shift mechanism G2 are also meshed with the corresponding driven gears 51, 52, and 53 provided in the counter shaft CS and rotatably drive the counter shaft CS. Note that a gear 49 fixed to the secondary shaft SS is coupled to a gear 55 in the idle shaft IDS and is coupled from the idle shaft IDS to the even stage clutch C2 with the outer main shaft OMS.

A reverse gear 58 is relatively rotatably disposed in an outer circumference of the reverse shaft RVS. Furthermore, a gear 50 in which a reverse synchromesh mechanism (a reverse synchronization engagement device) 85 is provided to be able to slide in the axial direction thereof to correspond to the reverse gear 58 and is engaged with the idle shaft IDS is fixed to the reverse shaft RVS. A reverse shift mechanism GR used to realize a reverse stage is constituted of the gears and synchromesh mechanisms provided in association with the reverse shaft RVS.

When the vehicle 1 is moved rearward (travels in reverse), the reverse synchromesh mechanism 85 is engaged and a first synchromesh mechanism 41 is engaged so that the even stage clutch C2 is engaged. Thus, rotation of the even stage clutch C2 is transferred to the reverse shaft RVS via the outer main shaft OMS and the idle shaft IDS so that the reverse gear 58 is rotated. The reverse gear 58 is meshed with a gear 56 in the inner main shaft IMS, and the inner main shaft IMS rotates in a direction opposite to that when it moves forward when the reverse gear 58 rotates. The rotation of the inner main shaft IMS in the opposite direction thereof is transferred from the carrier 73 in the planetary gear mechanism 70 to the 3-speed driving gear 43 via the 1-speed synchromesh mechanism 41 and then is transferred to the counter shaft CS.

The 2-3-speed driven gear 51, the 6-7-speed driven gear 52, the 4-5-speed driven gear 53, a parking gear 54, and a final driving gear 55 are fixedly disposed in the counter shaft CS in order from the left in FIG. 2. The final driving gear 55 is meshed with a differential ring gear (not shown) in the differential mechanism 5 and thus rotation of the counter shaft CS is transferred to an input shaft (that is, a vehicle propulsion shaft) in the differential mechanism 5.

In the transmission 4 with the above-described configuration, the 2-speed driving gear 42 is coupled to the secondary shaft SS when a synchronizing sleeve in the 2-6-speed synchromesh mechanism 83 slides to the left, and the 6-speed driving gear 46 is coupled to the secondary shaft SS when the synchronizing sleeve therein slides to the right. Furthermore, the 4-speed driving gear 44 is coupled to the secondary shaft SS when a synchronizing sleeve in the 4-speed synchromesh mechanism 84 slides to the right. The even stage clutch C2 is engaged in a state in which an even driving gear stage is selected in this way so that the transmission 4 is set to an even shift stage (a 2-speed, a 4-speed, or a 6-speed).

The 3-speed driving gear 43 is coupled to the inner main shaft IMS and thus a 3-speed-shift stage is selected when a synchronizing sleeve in the 3-7-speed synchromesh mechanism 81 slides to the left, and the 7-speed driving gear 47 is coupled to the inner main shaft IMS and thus a 7-speed-shift stage is selected when the synchronizing sleeve therein slides to the right. Furthermore, the 5-speed driving gear 45 is coupled to the inner main shaft IMS and thus a 5-speed-shift stage is selected when a synchronizing sleeve in the 5-speed synchromesh mechanism 82 slides to the right. The 1-speed synchromesh mechanism 41 is engaged in a state (a neutral state) in which the synchromesh mechanisms 81 and 82 do not select any of the gears 43, 47, and 45 so that rotation of the planetary gear mechanism 70 is transferred from the carrier 73 to the counter shaft CS via the gear 43 and thus a 1-speed-shift stage is selected. The odd stage clutch C1 is engaged in a state in which an odd driving gear step is selected in this way so that the transmission 4 is set to an odd shift stage (a 1-speed, a 3-speed, a 5-speed, or a 7-speed).

Determination in a shift stage to be realized in the transmission 4 and control used to realize the shift stage (selection of a shift stage in the first shift mechanism G1 and the second shift mechanism G2, that is, switching control of synchronization, control of engagement and disengagement between the odd stage clutch C1 and the even stage clutch C2, and the like) are performed by the ECU 10 in accordance with driving situations as is well known in the related art.

Also, in the control device in the hybrid vehicle in this embodiment, the ECU 10 estimates a revolution rate of the inner main shaft IMS using another method which is not based on detection of the motor revolution rate sensor 101 and performs engagement permission determination of the 1-speed synchromesh mechanism 41 included in the first shift mechanism G1 using the estimated value when determination has been made to be a state in which a revolution rate of the inner main shaft IMS (the first shift mechanism G1) cannot be detected normally by the motor revolution rate sensor 101 such as the failure in the motor revolution rate sensor 101. The specific content thereof will be described in detail below.

Figure 4:
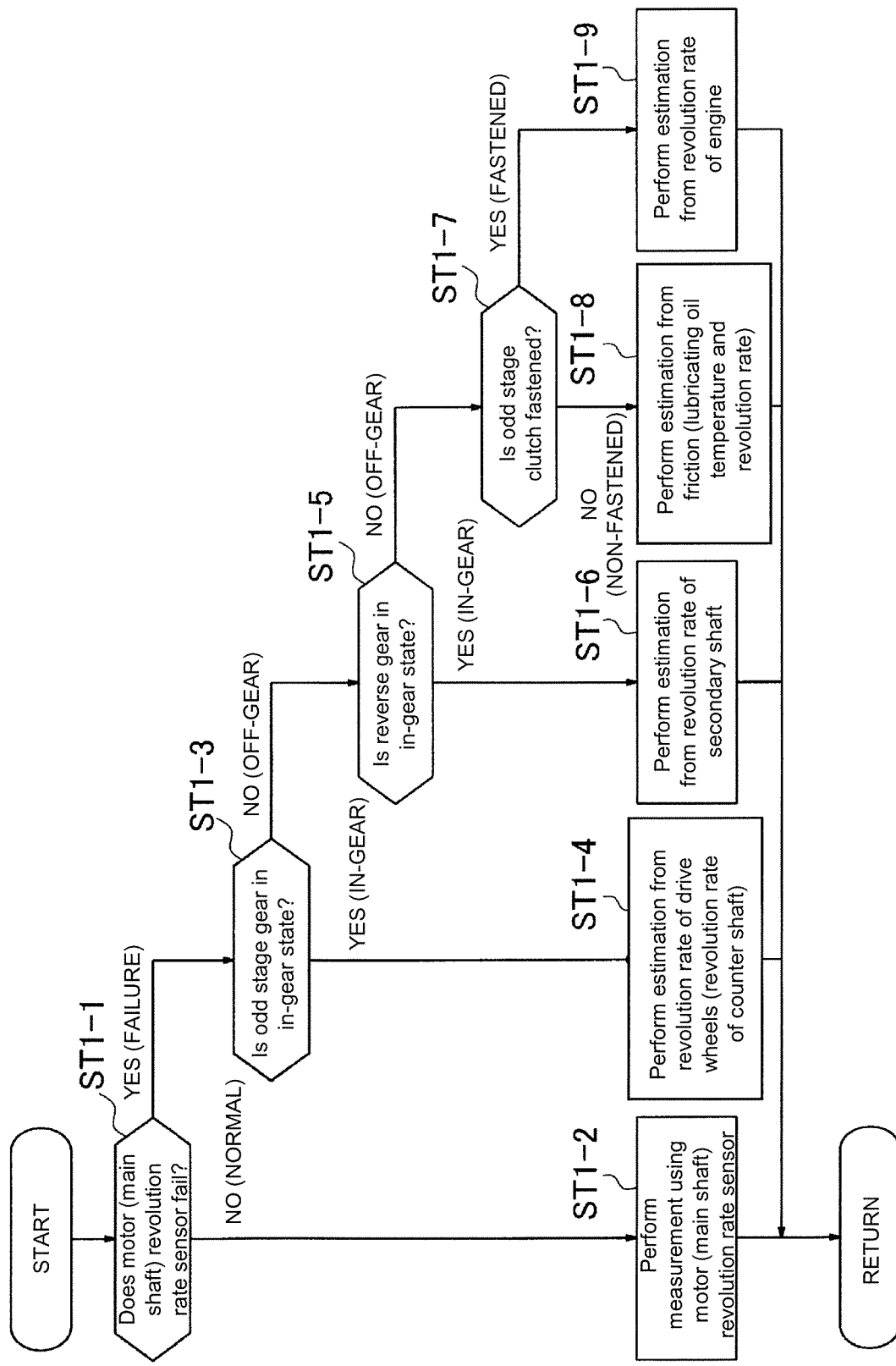
FIG. 4 is a flowchart for describing a procedure of estimating a revolution rate of an inner main shaft when it has been determined that a motor revolution rate sensor fails.

FIG. 4 is a flowchart for describing a procedure of estimating a revolution rate of the inner main shaft IMS when it has been determined that a motor (main shaft) revolution rate sensor 101 fails. In the flowchart in FIG. 4, first, it is determined whether the motor revolution rate sensor 101 has failed (Step ST1-1). Note that, although the failure in the motor revolution rate sensor 101 itself has been described as an example herein, detection of the failure in the motor revolution rate sensor 101 itself as well as detection of a state in which a revolution rate of the inner main shaft IMS cannot be detected normally by the motor revolution rate sensor 101 depending on other circumstances are included in determination corresponding to Step ST1-1 in the present invention. In other words, the state in which the revolution rate of the inner main shaft IMS cannot be detected normally by the motor revolution rate sensor 101 mentioned herein may include not only a case in which revolution rates of the motor 3 and the inner main shaft IMS cannot be detected due to the failure in the motor revolution rate sensor 101 itself but also a case, for example, in which a revolution rate of the inner main shaft IMS cannot be determined using a detected value of the motor revolution rate sensor 101 when any abnormality such as abnormality in a communication function (a communication function such as CAN) between the motor revolution rate sensor 101 and the ECU 10 and abnormality in other parts has occurred.

When it is determined that the motor revolution rate sensor 101 does not fail in Step ST1-1 (NO), a revolution rate of the inner main shaft IMS is usually detected by the motor revolution rate sensor 101. Moreover, a revolution difference in the 1-speed synchromesh mechanism 41 (a revolution rate difference between the carrier 73 in the planetary gear mechanism 70 and a 3-speed drive gear 43) is determined using the detected value of the revolution rate detected by the motor revolution rate sensor 101 and, on the basis of this, engagement (a 1-speed in-gear) permission determination in the 1-speed synchromesh mechanism 41 is performed.

On the other hand, when it is determined that the motor revolution rate sensor 101 fails in Step ST1-1 (YES), it is determined whether any of the 3-speed driving gear 43, the 5-speed driving gear 45, and the 7-speed driving gear 47 included in the first shift mechanism G1 (any of odd stage gears) is engaged (in an in-gear state) with the inner main shaft IMS (Step ST1-3). In other words, it is determined whether the 3-7-speed synchromesh mechanism 81 is engaged with a 3-speed side or a 7-speed side or the 5-speed synchromesh mechanism 82 is engaged therewith.

As a result, when any of the 3-speed driving gear 43, the 5-speed driving gear 45, and the 7-speed driving gear 47 is engaged with (is in an in-gear state with) the inner main shaft IMS (YES), a revolution rate of the inner main shaft IMS is estimated (calculated) on the basis of the revolution rate of the counter shaft CS detected by the counter shaft revolution rate sensor 102. In other words, when any of the 3-speed driving gear 43, the 5-speed driving gear 45, and the 7-speed driving gear 47 is engaged with the inner main shaft IMS, since the inner main shaft IMS and the counter shaft CS integrally rotate due to the engagement, a revolution rate of the inner main shaft IMS can be estimated using the revolution rate of the counter shaft CS. Note that, when a sensor for detecting revolution rates of any places (for example, constituent parts and the like of axles 6R and 6L and the differential mechanism 5) closer to sides of the drive wheels WR and WL than the counter shaft CS is provided in addition to the revolution rate of the counter shaft CS, a revolution rate of the inner main shaft IMS can also be estimated using the detected value of the sensor.

On the other hand, when none of the 3-speed driving gear 43, the 5-speed driving gear 45, and the 7-speed driving gear 47 is engaged (in an in-gear state) with the inner main shaft IMS in Step ST1-3 (NO), it is determined whether the reverse gear 58 is engaged (in an in-gear state) with the reverse shaft RVS (Step ST1-5). In other words, it is determined whether the reverse synchromesh mechanism 85 is engaged. As a result, when it is determined that the reverse gear 58 is engaged (in the in-gear state) with the reverse shaft RVS (YES), a revolution rate of the inner main shaft IMS is estimated (calculated) (Step ST1-6) on the basis of the revolution rate of the secondary shaft SS detected by the secondary shaft revolution rate sensor 103. In other words, when the reverse synchromesh mechanism 85 is engaged even when none of the 3-speed driving gear 43, the 5-speed driving gear 45, and the 7-speed driving gear 47 is engaged (in the in-gear state) with the inner main shaft IMS, since the inner main shaft IMS and the secondary shaft SS integrally rotate with the reverse synchromesh mechanism 85, a revolution rate of the inner main shaft IMS can be estimated using the revolution rate of the secondary shaft SS.

On the other hand, when the reverse gear 58 is not engaged (in the in-gear state) with the reverse shaft RVS in Step ST1-5 (NO), it is determined whether the odd stage clutch C1 is fastened (engaged) (Step ST1-7). As a result, when it is determined that the odd stage clutch C1 is not fastened (NO), a revolution rate of the inner main shaft IMS is estimated using a temperature of a lubricating oil detected by a lubricating oil temperature sensor 105 (Step ST1-8). In other words, when none of the 3-speed driving gear 43, the 5-speed driving gear 45, and the 7-speed driving gear 47 is engaged (in the in-gear state) with the inner main shaft IMS, the reverse gear 58 is not engaged with the reverse shaft RVS, and the odd stage clutch C1 is not fastened, a spontaneous decrease of a revolution rate obtained by considering friction in the transmission 4 along with rotation of constituent parts of the first shift mechanism G1 such as the inner main shaft IMS is predicted using the temperature of the lubricating oil detected by the lubricating oil temperature sensor 105 so that a revolution rate of the inner main shaft IMS can be estimated. Note that, here, a decrease in revolution rate obtained by considering the temperature of the lubricating oil is predicted using the revolution rate of the inner main shaft IMS acquired from the revolution rate (the revolution rate of the crankshaft 2a detected by the crankshaft revolution rate sensor 104) in the engine 2 when the odd stage clutch C1 is fastened as an initial value.

On the other hand, when it is determined that the odd stage clutch C1 is fastened in Step ST1-7 (YES), a revolution rate of the inner main shaft IMS is estimated using the revolution rate of the crankshaft 2a (the revolution rate of the engine 2) detected by the crankshaft revolution rate sensor 104 (Step ST1-9). In other words, when the odd stage clutch C1 is fastened even when none of the 3-speed driving gear 43, the 5-speed driving gear 45, and the 7-speed driving gear 47 is engaged (in the in-gear state) with the inner main shaft IMS and the reverse gear 58 is not engaged with the reverse shaft RVS, since rotation of the crankshaft 2a is transferred to the inner main shaft IMS via the odd stage clutch C1, a revolution rate of the inner main shaft IMS can be estimated using the revolution rate of the crankshaft 2a.

Also, in the control in this embodiment, if the revolution rate difference (a revolution difference) of the first synchromesh mechanism 41 based on the revolution rate of the inner main shaft IMS estimated as described above is the predetermined value or more when a shift position in a reverse stage (a reverse stage) is detected by the shift position sensor 106, control is performed so that indication concerning preparation of the reverse state is displayed on the display unit 107. This content will be described below.

Figure 5:
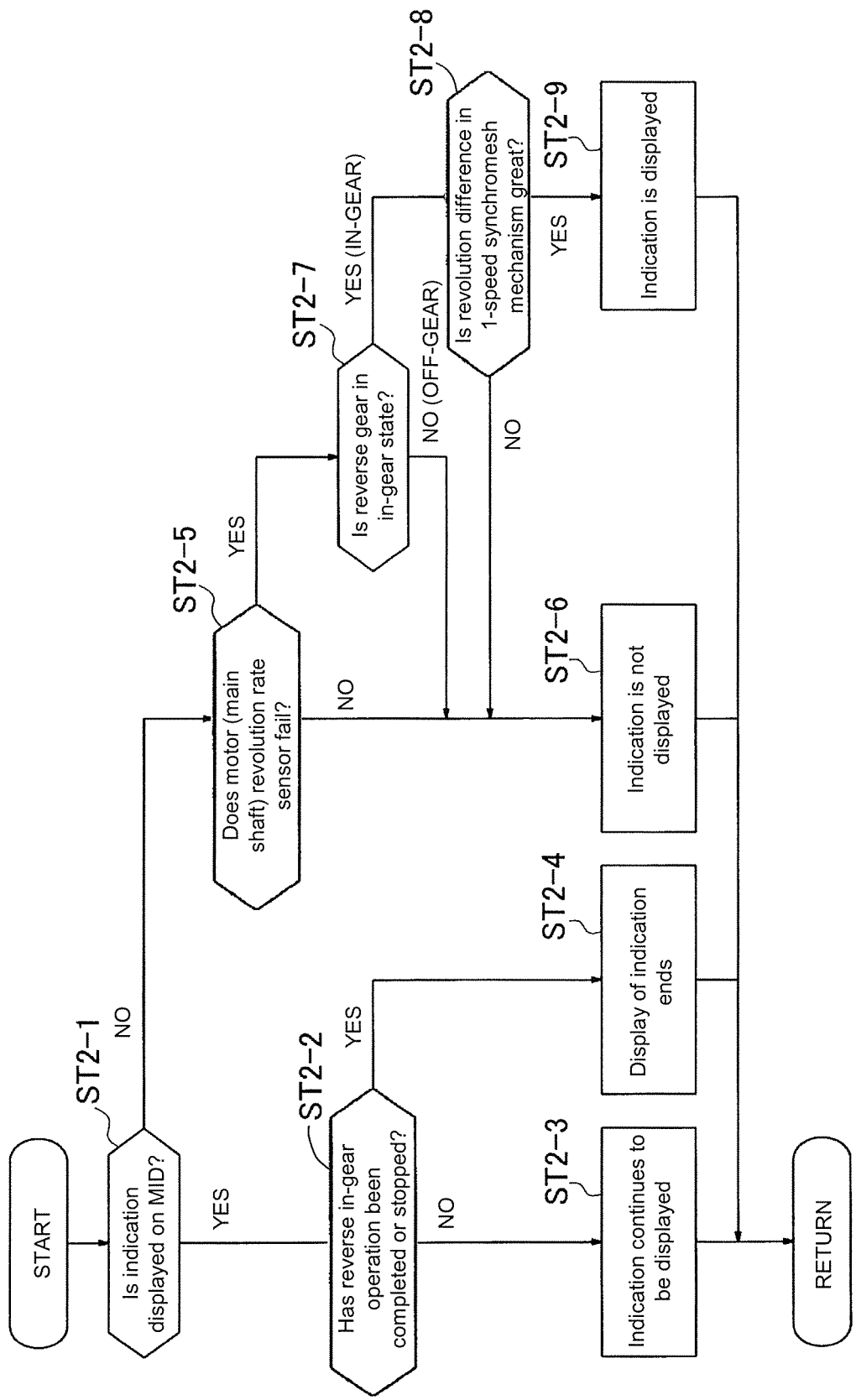
FIG. 5 is a flowchart for describing a procedure of determination about display of indication concerning preparation of a reverse stage.

FIG. 5 is a flowchart for describing a procedure of determination about display of indication concerning preparation of a reverse stage. In the flowchart in FIG. 5, first, it is determined whether indication concerning preparation of a reverse stage has already been displayed (Step ST2-1). Note that indication concerning preparation of a reverse stage is displayed on the MID by turning on a lamp with, for example, the inscription "Gear is being prepared. Please wait with foot on brake (BRK)."

When it is determined that the indication concerning preparation of the reverse stage has already been displayed in Step ST2-1 (YES), it is determined whether a reverse in-gear operation has been completed or stopped (Step ST2-2). As a result, when the reverse in-gear operation has not been completed or stopped (NO), that is, when the reverse in-gear operation continues, indication concerning preparation of the reverse stage continues to be displayed as it is (Step ST2-3). On the other hand, when the reverse in-gear operation has been completed or stopped in Step ST2-2 (YES), display of the indication concerning preparation of the reverse stage ends (Step ST2-4).

Also, when the indication concerning preparation of the reverse stage is not displayed in the foregoing Step ST2-1 (NO), it is determined whether the motor revolution rate sensor 101 fails (Step ST2-5). Note that the determination in Step ST2-5 has the same content as the determination in Step ST1-1 in FIG. 4. As a result, when it is determined that the motor revolution rate sensor 101 does not fail (NO), the indication concerning preparation of the reverse stage is not displayed (Step ST2-6). On the other hand, when it is determined that the motor revolution rate sensor 101 fails (YES), it is determined whether the reverse synchromesh mechanism 85 is engaged (in an in-gear state) (Step ST2-7). As a result, when it is determined that the reverse synchromesh mechanism 85 is not engaged (off-gear) (NO), the indication concerning preparation of the reverse stage is not displayed (Step ST2-6). On the other hand, when it is determined that the reverse synchromesh mechanism 85 is engaged (in the in-gear state) (YES), it is determined whether a revolution difference (a revolution rate difference between the carrier 73 in the planetary gear mechanism 70 and the 3-speed drive gear 43) in the 1-speed synchromesh mechanism 41 is greater than a predetermined threshold value (Step ST2-8). As a result, when the revolution difference in the 1-speed synchromesh mechanism 41 is the predetermined threshold value or less (NO), the indication concerning preparation of the reverse stage is not displayed (Step ST2-6). On the other hand, when the revolution difference in the 1-speed synchromesh mechanism 41 is the predetermined threshold value or more (YES), the indication concerning preparation of the reverse state is displayed (Step ST2-9).

In other words, if the revolution difference in the 1-speed synchromesh mechanism 41 based on the revolution rate of the inner main shaft IMS is the predetermined value or more when a shift position of a reverse stage (a reverse stage) is detected by the shift position sensor 106, control is performed to display the indication concerning preparation of the reverse stage on the MID.

As described above, when the revolution difference in the 1-speed synchromesh mechanism 41 based on the estimated revolution rate of the inner main shaft IMS is the predetermined value or more, since it takes time to engage the 1-speed synchromesh mechanism 41 and accordingly to complete setting of the reverse stage, indication concerning preparation of the setting of the reverse stage is displayed so that the driver of the vehicle can be notified of the indication.

Also, in the control device in the hybrid vehicle in this embodiment, if a vehicle speed detected by the vehicle speed sensor 35 is a first threshold value V1 or less when it is not determined that the motor revolution rate sensor 101 fails in Step ST1-1 shown in FIG. 5, a setting operation in a reverse stage (R) using the shift lever 110 is permitted. On the other hand, if a vehicle speed detected by the vehicle speed sensor 35 is a second threshold value V2 or less which is lower than the above-described first threshold value V1 when it is determined that the motor revolution rate sensor 101 fails in Step ST1-1, the setting operation in the reverse stage (R) using the shift lever 110 is permitted. In other words, a vehicle speed at which the setting operation in the reverse stage (R) using the shift lever 110 is permitted differs depending on the presence or absence of determination concerning the fact that the motor revolution rate sensor 101 fails. Note that the vehicle speed of the second threshold value V2 or less mentioned herein can be set to, for example, a vehicle speed at which the vehicle 1 can be regarded as being substantially stopped.

Since the revolution rate of the inner main shaft IMS cannot be accurately ascertained when it is determined that the motor revolution rate sensor 101 fails, the setting operation in the reverse stage (R) using the shift lever 110 is performed. Thus, it takes longer to actually set the reverse stage due to time spent waiting for a decrease in the revolution rate of the inner main shaft IMS. For this reason, here, when it is determined that the motor revolution rate sensor 101 fails, the threshold value (the second threshold value V2) of the vehicle speed at which the setting operation in the reverse stage using the shift lever 110 is permitted is set to a vehicle speed which is lower than the threshold value (the first threshold value V1) when it is not determined that the motor revolution rate sensor 101 fails (V1>V2). Thus, when the revolution rate of the inner main shaft IMS cannot be detected normally due to the failure or the like in the motor revolution rate sensor 101, the time taken to actually set the reverse stage after the setting operation in the reverse stage (R) by the operation of the shift lever 110 can be prevented from being lengthened.

Also, in the control device in the hybrid vehicle in this embodiment, the ECU 10 may perform control to limit a degree of throttle opening (a degree of throttle valve opening) in the engine 2 to a predetermined value or less regardless of an operation quantity of the accelerator pedal 120 detected by the accelerator pedal sensor 31 when a shift position (P/N) at which the vehicle is stopped is detected by the shift position sensor 106.

Since there is a concern about the revolution rate of the inner main shaft IMS not being able to be accurately ascertained when it is determined that the motor revolution rate sensor 101 fails, if the revolution rate of the inner main shaft IMS is rapidly increased by rapidly increasing the degree of throttle opening in the engine 2 in this case, it takes a long time to determine a decrease in revolution rate. Particularly, when the odd stage clutch C1 is fastened and the high voltage battery 30 is charged by rotating the motor 3 serving as a generator using a driving force of the engine 2 in a state in which a shift position is a P position or an N position, if a revolution rate of the engine 2 increases, the reverse stage (R) is set by an operation of the shift lever 110 in this state, and the fastening of the odd stage clutch C1 is released, an initial value of the revolution rate of the inner main shaft IMS (an initial value used for estimating the revolution rate) is high. Thus, it takes a long time to determine a decrease in revolution rate of the inner main shaft IMS and to perform in-gear determination in the 1-speed synchromesh mechanism 43.

Thus, in this embodiment, when the P position or the N position (the shift position at which the vehicle 1 is stopped) is detected by the shift position sensor 106, control is performed to limit the degree of throttle opening in the engine 2 to the predetermined value or less regardless of the operation quantity of the accelerator pedal 120. Thus, an excess increase in the revolution rate of the engine 2 is prevented and thus determination of a decrease in the revolution rate of the inner main shaft IMS can be prevented from taking up time. Therefore, engagement permission determination in the 1-speed synchromesh mechanism 41 can be performed earlier than usual even when it is determined that the motor revolution rate sensor 101 fails.

As described above, according to the control device in the hybrid vehicle in this embodiment, when the revolution rate of the first input shaft IMS cannot be detected normally by the motor revolution rate sensor 101, engagement permission determination in the 1-speed synchromesh mechanism 41 (a switching mechanism associated with the lowest shift stage in the first shift mechanism G1) can be performed using the estimated value of the revolution rate of the first input shaft IMS. Therefore, an engagement operation in the 1-speed synchromesh mechanism 41 can be secured even when a malfunction such as failure occurs in the motor revolution rate sensor 101 or a peripheral device thereof.

Although the embodiment of the present invention has been described above, the present invention is not limited to the above-described embodiment, and various modifications can be performed without departing from the technical idea disclosed in the claims, the specification, and the drawings. For example, the detailed configuration of the transmission shown in FIGS. 2 and 3 is merely an example. In addition, as long as the transmission (the twin clutch type transmission) according to the present invention is the transmission including at least the basic configuration shown in FIG. 1, the detailed configuration is not limited to the configuration shown in FIGS. 2 and 3 and may include other configurations.

Also, the transmission 4 illustrated in the above-described embodiment is a transmission with a configuration in which the rotating shaft in the motor 3 is joined to the inner rotating shaft (the first input shaft) IMS in which the first shift mechanism G1 configured to set the odd shift stage is provided. Here, besides this, although not illustrated, the transmission 4 may be a transmission with a configuration in which the rotating shaft in the motor is joined to the rotating shaft in which the shift mechanism configured to set the odd shift stage is provided.

What is claimed is:

1. A control device in a hybrid vehicle, the hybrid vehicle comprising:
   an internal combustion engine and an electric motor serving as driving sources in the hybrid vehicle; and
   a transmission including:
   a first input shaft which is connected to the electric motor and is optionally connected to the engine output shaft in the internal combustion engine with a first clutch;
   a second input shaft which is optionally connected to the engine output shaft in the internal combustion engine with a second clutch;
   an output shaft configured to output power toward drive wheels;
   a first shift mechanism including a plurality of shift gears provided between the first input shaft and the output shaft and one or more engagement switching mechanisms which optionally engage any of the plurality of shift gears with the first input shaft or the output shaft and by which any one of odd shift stages and even shift stages is able to be set;
   a second shift mechanism including a plurality of other shift gears provided between the second input shaft and the output shaft and one or more engagement switching mechanisms which optionally engage any of the plurality of other shift gears with the second input shaft or the output shaft and by which the other of the odd shift stages and the even shift stages is able to be set; and
   a reverse shift mechanism in which a reverse shift stage disposed between the first input shaft and the output shaft is able to be set, and
   the control device comprising:
   an electronic control unit (ECU) configured to control driving of the hybrid vehicle; and
   a first input shaft revolution rate sensor configured to detect a revolution rate of the first input shaft,
   wherein the ECU is further configured to estimate the revolution rate of the first input shaft by a method without using the first input shaft revolution rate sensor, and
   when the revolution rate of the first input shaft is unable to be detected normally by the first input shaft revolution rate sensor,
   the ECU performs engagement permission determination in a switching mechanism associated with the lowest shift stage in the first shift mechanism by using an estimated value of the revolution rate of the first input shaft, wherein the estimated value is estimated by the method without using the first input shaft revolution rate sensor.

2. The control device in the hybrid vehicle according to claim 1, further comprising:
   an output shaft revolution rate sensor configured to detect a revolution rate of the output shaft,
   wherein the ECU estimates the revolution rate of the first input shaft using the revolution rate of the output shaft detected by the output shaft revolution rate sensor when any of switching mechanisms other than the switching mechanism associated with the lowest shift stage in the first shift mechanism is engaged.

3. The control device in the hybrid vehicle according to claim 1, further comprising:
   a second input shaft revolution rate sensor configured to detect a revolution rate of the second input shaft,
   wherein the ECU estimates the revolution rate of the first input shaft using the revolution rate of the second input shaft detected by the second input shaft revolution rate sensor when none of the switching mechanisms other than the switching mechanism associated with the lowest shift stage in the first shift mechanism is engaged and a switching mechanism in the reverse shift mechanism is engaged.

4. The control device in the hybrid vehicle according to claim 1, further comprising:
   an internal combustion engine revolution rate sensor configured to detect an engine revolution rate of the internal combustion engine,
   wherein the ECU estimates the revolution rate of the first input shaft using the engine revolution rate of the internal combustion engine detected by the internal combustion engine revolution rate sensor when none of the switching mechanisms other than the switching mechanism associated with the lowest shift stage in the first shift mechanism is engaged, a switching mechanism in the reverse shift mechanism is not engaged, and the first clutch is fastened.

5. The control device in the hybrid vehicle according to claim 1, further comprising:
   a lubricating oil temperature sensor configured to detect a temperature of a lubricating oil used to lubricate at least a constituent part of the first shift mechanism,
   wherein the ECU estimates the revolution rate of the first input shaft using the temperature of the lubricating oil detected by the lubricating oil temperature sensor when none of the switching mechanisms other than the switching mechanism associated with the lowest shift stage in the first shift mechanism is engaged, a switching mechanism in the reverse shift mechanism is not engaged, and the first clutch is not fastened.

6. The control device in the hybrid vehicle according to claim 1, wherein the transmission is constituted such that the switching mechanism in the reverse shift mechanism is engaged and the switching mechanism associated with the lowest shift stage in the first shift mechanism is engaged so that a reverse driving force is transferred to the drive wheels.

7. The control device in the hybrid vehicle according to claim 2, wherein the transmission is constituted such that the switching mechanism in the reverse shift mechanism is engaged and the switching mechanism associated with the lowest shift stage in the first shift mechanism is engaged so that a reverse driving force is transferred to the drive wheels.

8. The control device in the hybrid vehicle according to claim 3, wherein the transmission is constituted such that the switching mechanism in the reverse shift mechanism is engaged and the switching mechanism associated with the lowest shift stage in the first shift mechanism is engaged so that a reverse driving force is transferred to the drive wheels.

9. The control device in the hybrid vehicle according to claim 4, wherein the transmission is constituted such that the switching mechanism in the reverse shift mechanism is engaged and the switching mechanism associated with the lowest shift stage in the first shift mechanism is engaged so that a reverse driving force is transferred to the drive wheels.

10. The control device in the hybrid vehicle according to claim 5, wherein the transmission is constituted such that the switching mechanism in the reverse shift mechanism is engaged and the switching mechanism associated with the lowest shift stage in the first shift mechanism is engaged so that a reverse driving force is transferred to the drive wheels.

11. The control device in the hybrid vehicle according to claim 6, further comprising:
a shift operating unit by which a driver performs a selection operation of a shift position in the hybrid vehicle;
a shift position sensor configured to detect the shift position selected through the selection operation of the shifting operating unit; and
a display unit configured to display indication concerning preparation of setting of a reverse stage in the transmission,
wherein the ECU performs control so that the indication concerning the preparation of setting of the reverse stage is displayed on the display unit if a revolution rate difference between switching mechanisms associated with the lowest shift stage in the first shift mechanism based on the revolution rate of the first input shaft estimated by the ECU unit is a predetermined value or more when the shift position of the reverse stage is detected by the shift position sensor.

12. The control device in the hybrid vehicle according to claim 11, wherein the ECU ends the display of the indication concerning preparation of setting of the reverse stage on the display unit if the setting of the reverse stage has been completed through the engagement of the switching mechanism associated with the lowest shift stage in the first shift mechanism.

13. The control device in the hybrid vehicle according to claim 11, further comprising:
a vehicle speed sensor configured to detect a vehicle speed,
wherein the ECU permits the setting operation of the reverse stage by the shift operating unit if the vehicle speed detected by the vehicle speed sensor is a first threshold value or less when the revolution rate detection-disable determination is not performed, and
permits the setting operation of the reverse stage by the shift operating unit if a vehicle speed detected by the vehicle speed sensor is a second threshold value or less which is smaller than the first threshold value when the revolution rate detection-disable determination is performed.

14. The control device in the hybrid vehicle according to claim 12, further comprising:
a vehicle speed sensor configured to detect a vehicle speed,
wherein the ECU permits the setting operation of the reverse stage by the shift operating unit if the vehicle speed detected by the vehicle speed sensor is a first threshold value or less when the revolution rate detection-disable determination is not performed, and
permits the setting operation of the reverse stage by the shift operating unit if a vehicle speed detected by the vehicle speed sensor is a second threshold value or less which is smaller than the first threshold value when the revolution rate detection-disable determination is performed.

15. The control device in the hybrid vehicle according to claim 11, further comprising:
an accelerator operator operated by the driver in the vehicle,
wherein the ECU is further configured to control a degree of throttle opening in the internal combustion engine in accordance with an operation quantity by the accelerator operator, and
when a shift position at which the vehicle is stopped is detected by the shift position sensor,
the ECU controls the degree of throttle opening in the internal combustion engine to be limited to a predetermined value or less regardless of the operation quantity by the accelerator operator.

16. The control device in the hybrid vehicle according to claim 12, further comprising:
an accelerator operator operated by the driver in the vehicle,
wherein the ECU is further configured to control a degree of throttle opening in the internal combustion engine in accordance with an operation quantity by the accelerator operator, and
when a shift position at which the vehicle is stopped is detected by the shift position sensor,
the ECU unit controls the degree of throttle opening in the internal combustion engine to be limited to a predetermined value or less regardless of the operation quantity by the accelerator operator.

17. The control device in the hybrid vehicle according to claim 13, further comprising:
an accelerator operator operated by the driver in the vehicle,
wherein the ECU is further configured to control a degree of throttle opening in the internal combustion engine in accordance with an operation quantity by the accelerator operator, and
when a shift position at which the vehicle is stopped is detected by the shift position sensor,
the ECU controls the degree of throttle opening in the internal combustion engine to be limited to a predetermined value or less regardless of the operation quantity by the accelerator operator.

18. The control device in the hybrid vehicle according to claim 14, further comprising:
an accelerator operator operated by the driver in the vehicle,
wherein the ECU is further configured to control a degree of throttle opening in the internal combustion engine in accordance with an operation quantity by the accelerator operator, and
when a shift position at which the vehicle is stopped is detected by the shift position sensor,
the ECU controls the degree of throttle opening in the internal combustion engine to be limited to a predetermined value or less regardless of the operation quantity by the accelerator operator.

\* \* \* \* \*